United States Patent [19]

Korpela et al.

[11] 4,067,672
[45] Jan. 10, 1978

[54] APPARATUS FOR PRODUCING A BODY OF POROUS THERMOPLASTIC MATERIAL

[75] Inventors: Heikki Korpela, Helsingborg; Lars Norrhede, Bjuv; Ralf Wärna, Katrineholm, all of Sweden

[73] Assignee: Gullfiber AB, Billesholm, Sweden

[21] Appl. No.: 633,651

[22] Filed: Nov. 20, 1975

[30] Foreign Application Priority Data

Nov. 20, 1974 Sweden .............................. 7414594

[51] Int. Cl.$^2$ .......................................... B29D 27/04
[52] U.S. Cl. ................... 425/4 C; 222/488; 222/564; 264/DIG. 12; 425/371; 425/817 C
[58] Field of Search ............... 264/46.2, 46.3, DIG. 9, 264/DIG.10, DIG. 11, DIG. 12, 51; 425/4 C, 817 C, 371, 372, 4 R, 817 R; 222/193, 488, 564; 34/57 R, 57 B

[56] References Cited

U.S. PATENT DOCUMENTS

| 3,142,864 | 8/1964 | Pelley | 264/46.2 X |
| 3,178,768 | 4/1965 | Edberg | 425/4 C |
| 3,626,486 | 12/1971 | Bugbee et al. | 222/564 X |
| 3,832,099 | 8/1974 | Berg | 425/817 C X |
| 3,917,439 | 11/1975 | Yovanovich | 264;425/DIG. 12;817 C X |

*Primary Examiner*—Francis S. Husar
*Assistant Examiner*—Mark Rosenbaum
*Attorney, Agent, or Firm*—Shlesinger, Fitzsimmons & Shlesinger

[57] ABSTRACT

The invention relates to an apparatus for continuous production of a strand of porous thermoplastic material from preferably pre-expanded granules of said material containing an expanding agent. The apparatus comprises an elongated rectangular channel, two opposite sides of which are formed by the horizontal parts facing one another of two superimposed endless belts moving in a closed path between turning rollers. The granules are introduced through the open intake end of said channel and are expanded to final size and sintered together to a porous coherent strand by means of steam fed between the horizontal belt parts facing one another. The steam and the granules are fed into the channel through individual ducts which are separated from one another and connected to the intake end portion of the channel. Usually, a plurality of granule feeding ducts and a plurality of steam supplying ducts are attached to the intake end portion formed as a box of particular shape. Some specific grouping of the ducts connected to said box has proved to render excellent results in uniform distribution of the granules and even heating to sintering temperature.

3 Claims, 2 Drawing Figures

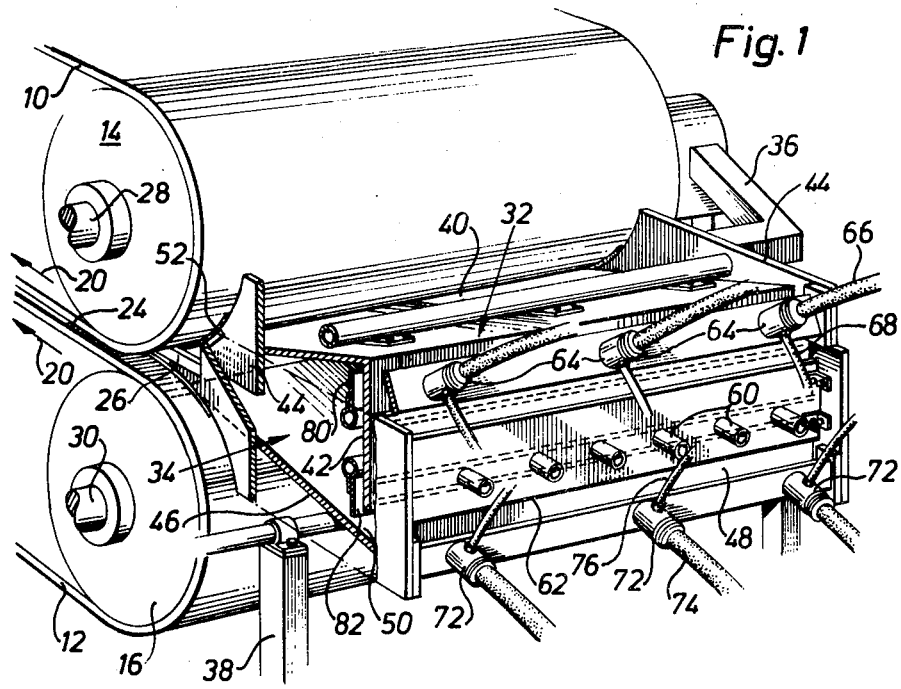
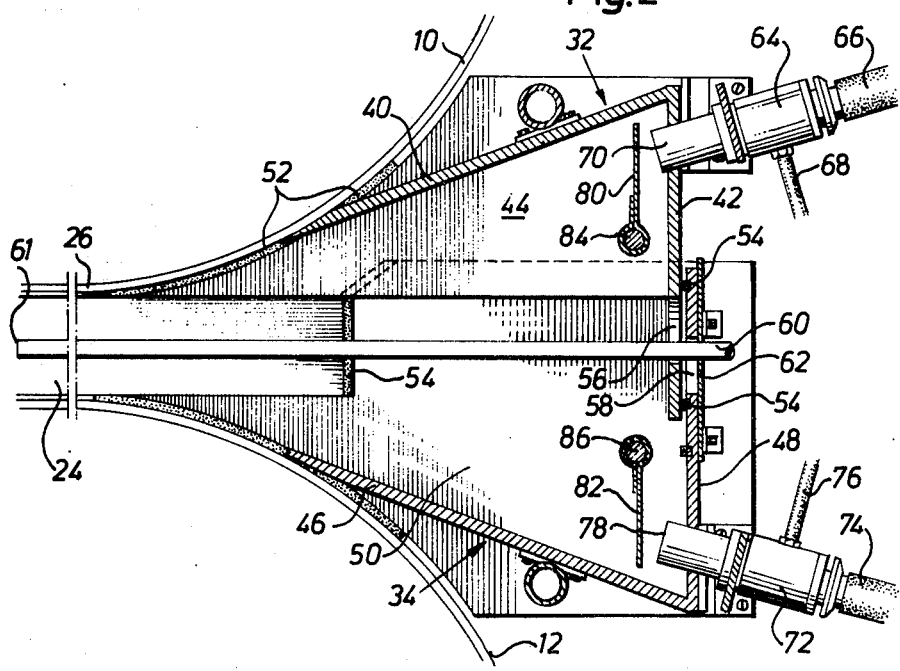

APPARATUS FOR PRODUCING A BODY OF POROUS THERMOPLASTIC MATERIAL

This invention relates to an apparatus for producing a body of porous thermoplastic material having the shape of a continuously advancing strand by means of granules containing a blowing or expanding agent, said apparatus comprising an elongated, rectangularly profiled channel open at both ends and at two opposite sides defined by one horizontal part each of an endless belt movable along a closed circuit between turning rollers. The channel has a heating zone operated with steam as heating agent for the expansion of the granules and sintering thereof together and a cooling zone within which the final product is cooled by means of a cooling agent such as air.

Continuously operated machines of the general type in consideration are disclosed e.g. in the British Patent Specification No. 854,478.

According to a generally adopted construction the steam is supplied from steam boxes located outside the parts facing one another of the belts through perforations formed in said belts. These perforated belts cause great difficulties by wear and often occuring stoppages for cleaning of the belts and the interior of the steam boxes. Small particles of the plastic material penetrate through the perforations and foul the steam boxes. This penetration of the small plastic particles into the steam boxes also results in that rollers provided in said steam boxes for taking up the pressure from the belts get locked so that a rapid wear on the belts is initiated.

It has been proposed to supply steam together with the granules of plastic material by means of ejectors disposed at the intake end portion of the channel, which proposal permits to dispense with the steam boxes and in this way with the perforations in the belts also. However, it proved impossible by this expedient to accomplish uniform distribution and heating of the granules. Furthermore, due to the relatively high temperature, the granules got to become sticky before they left the ejectors, so that deposition of plastic material on the inner side of the supply ducts could not be avoided.

One main object of the invention is to provide an apparatus which eliminates the drawbacks inherent to the steam supply through the belts and the perforations formed in them and which renders possible even distribution of the mass of granules as well as the steam within the channel so that a highly homogen, porous strand of plastic material is obtained.

Another important object of the invention is to provide an apparatus of the type defined above, the belts of which have a considerably longer life than in known apparatus.

These objects are realized according to one main feature of the invention, substantially by providing the supply of the steam and that of the granules into the channel through individual ducts separated from one another and both connected to the intake end portion of the channel.

According to another main feature of the invention a plurality of steam ducts and a plurality of granules supplying ducts are connected to the intake end portion of the channel, the first-mentioned ones projecting farther in the direction towards the channel than the second-mentioned ones.

Further objects, features and advantages of the invention will become evident from the following description of an embodiment shown by way of example in the accompanying drawing, which forms part of this specification, and of which:

FIG. 1 is a perspective view of the intake end portion of an apparatus constructed according to the invention.

FIG. 2 is a longitudinal sectional view in a larger scale of said portion.

Referring now to the drawing, reference numeral 10 denotes an upper belt and reference numeral 12 a lower belt made of some flexible material such as steel, rubber or plastic, each belt being positioned to run over two rotatable conducting rollers of which one for each belt, denoted respectively, 14 and 16, are shown in FIG. 1. The belts are driven by the rollers in the direction indicated by the arrows 20 and 21, respectively. The parts facing one another of said belts define a straight channel 24 within which the final expansion and sintering together of the pre-expanded granules of a porous thermoplastic material is effected. Thus, the channel is formed at the top and bottom by these belt parts and laterally by straight guide plates 26. The rollers are carried by shafts 28, 30 mounted in bearings in the stationary frame of the apparatus, the upper pair of rollers in known manner being adjustable to their height level for change of the height of the channel 24 and therewith the thickness of the strand of the plastic material produced therein.

Provided at the intake end of the channel 24 is a box composed of an upper part 32 and a lower part 34. The upper part 32 is by means of braces 36 rigidly secured onto the bearing bushings of the upper roller 14 so that said part follows the upper roller in adjustment movement thereof for adjustment of the height level position. The lower box part 34 is rigidly secured to the stationary frame 38 of the apparatus.

The upper box part 32 has a roof or cover 40 which extends from the belt 10 at some distance from the channel 24 where said belt during its movement still is in contact with the roller 14. The cover 40 extends at least approximately tangentially rearwards and upwards and is connected to an outer vertical wall 42 and two vertical lateral walls 44. In the same manner the lower box part 34 is formed with a bottom 46 which extends substantially tangentially downwards and outwards from a place of the belt 12 which is located substantially right below the end edge of the cover 40. The bottom 46 merges into a vertical outer wall 48 and two vertical lateral walls 50. As is easily understood, the box parts are open towards one another and their vertical walls overlap one another in such a manner as to cause the interior of the box to be closed in the lateral and outward directions at all possible positions of adjustment of the upper roller 14.

Located between the parts of the belts 10, 12 bearing against the associated roller and the two box parts are sealing means 52, which preferably are of such a nature that they are the kind of filters or screens which permit a noncondensable gas such as air, but not the granules of plastic material, to pass therethrough. Similar sealing means 54 are provided between the lateral straight defining plates of the channel and the box parts and at the portions of said parts overlapping one another.

The rear end walls 42 and 48 are formed within openings 56 and 58 of such configuration as to register with one another. Through these openings, and apertures 60 in an adjustable cover plate 62, there is introduced, according to the invention, a plurality of steam ducts or pipes 60, which are evenly, or at least almost evenly, distributed over the cross-sectional area of the channel 24. The pipes 60, the number of which is six in the illustrated embodiment, extend in the direction of movement of the belts through the box 32, 34 and project for some distance into the channel 24, where their openings 61 are positioned. The interior of the pipes is screened off from the surroundings especially inside the channel so that the mass of granules is protected against heating by otherwise possible contact with the pipes and premature expansion or sticking fast onto said pipes. The steam has a temperature slightly exceeding atmospheric pressure and a corresponding temperature.

According to a particularly expedient embodiment the straight tubes 60 have an external coating of a material such as polytetrafluoroethylene ("Teflon" ®), which firstly constitutes an heat insulating layer and secondly permits the mass of granules easily to slide along the pipes. Another expedient embodiment is to cool the pipes by means of a cooling agent which is conducted through the clearance of the jacketed wall of each pipe. In order to fit to the minimum height to which the channel can be adjusted, the tubes 60 may be flattened at least in their portion located inside the channel 24 so that their breadth exceeds their height.

Fitted to the upper box part 32 is a number of ejectors 64 distributed in lateral direction over said box part. In the illustrated embodiment, the number of such ejectors is three and they are positioned in one row. Each ejector has a flexible pipe 66 for connection to a supply of the granules of plastic material, and a flexible pipe 68 for attachment to a supply of compressed air. The ejectors 64 penetrate through the box wall 42 so that their openings 70 are situated in the interior of the box. In the same manner ejectors 72 are disposed in one row in the stationary lower box part 34. They are supplied with granules of plastic material through a flexible pipe 74 and with compressed air through a flexible pipe 76, and their openings 78 are also situated inside of the vertical wall 48.

If desired, flaps 80, 82 may be provided directly opposite the openings 70 and 78, respectively, of the ejectors. Each upper flap 80 is near its lower edge mounted to pivot about a shaft 84; and each lower flap 82 near its upper edge is mounted to pivot about a shaft 86. The flaps may be spring-loaded for adjustment to varying angular positions.

In the operation of the apparatus, the pre-expanded granules are blown through the ejectors 64, 72 by means of compressed air into the interior of the box where they collect ahead of the inlet opening into the channel 24. Thereupon, they are conveyed by the belts 10, 12 into the portions of the channel defined by the straight belt portions. The carrying air which has room temperature or a temperature in the neighborhood of room temperature is allowed to escape through the filtering sealing means 52, 54. At the same time steam is supplied through the pipes 60 which inside the channel 24 establishes good contact with the granules which are expanded to their final volume and sintered together. The sintered mass of granules is advanced further within the channel 24 to a cooling zone (not shown) where it is cooled down.

The supply of granules can be controlled in such a manner for each individual width of the channel that the granules become uniformly distributed over the entire cross-sectional area of the channel. The flaps 80, 82 have for their purpose to allow control of the supply of granules in such a manner that this does not become too great temporarily. If the flaps are spring-actuated their angular position diverging from the shown vertical starting position may automatically be adjusted by means of the pressure effect exerted by the jet air in such a manner that they guide the granules in a direction towards the channel.

When adjusting the apparatus for a new thickness of the strand the upper rollers 14 are lifted and new lateral defining plates 26 corresponding to the new height of the channel fitted. Thus, the box with its ejectors need not be disassembled. The ejectors are adjustable to that capacity which corresponds to the required quantity of granules for each individual channel height and thus the height dimension of the final strand of expanded plastic material. The height of the channel may be varied e.g. between 1.5 and 30.0 cms.

The steam pipes 60 are adjusted so as always, irrespective of varying heights of the channel, to be positioned approximately halfways between the belts 10 and 12.

The granules of plastic material prior to their introduction into the channel 24 are pre-expanded to a size approximating the final volume. This is effected in known manner in a preceding step outside the continuously operating apparatus.

The belts may have some perforations to permit easy escape of the ejector air from the box 32,34. These perforations may be disposed for this purpose in a thinly scattered manner and have a very little diameter, for which reasons they do not cause the troubles described above as inevitable with the constructions of the prior art.

The construction with the ejectors driven by compressed air is described in the British Patent Application No. 3147/74, for example. Due to the absence of perforations in the belt for the supply of steam to the expansion and sintering channel, the apparatus can be used to advantage for lamination of a porous strand or sheet of plastic material, i.e., by having the strand in the apparatus provided with a layer of some other material which may consist of plates of hardboard or windable mats or some similar material. This method is applicable, e.g., to the manufacture of building elements of the laminar type.

While one more or less specific embodiment of the invention has been shown and described, it is to be understood that this is for purpose of illustration only, and that the invention is not to be limited thereby, but its scope is to be determined by the appended claims.

We claim:

1. Apparatus for manufacturing a body of porous thermoplastic material having the form of a continuously advancing strand made from granules containing an expanding agent, said apparatus comprising
    means defining an elongate channel open at both ends, said means including two endless belts each having one reach thereof mounted to form one of two opposite sides, respectively, of said channel, and movable from an intake at one end of the channel to an outlet at its opposite end,
    a casing connected to the intake end of said channel,
    a plurality of spaced ejectors associated with said casing and having discharge ends opening on the interior thereof,
    means operatively associated with said ejectors for connecting said ejectors to a source of compressed air and to a source of granules containing an expanding agent, and operable for feeding said granules by compressed air successively through said ejectors and casing and into said channel through the intake end thereof, and a plurality of steam ducts extending through said casing and into said channel through the intake end thereof for supplying steam to the granules after entry thereof into said channel, said ejectors having the discharge ends thereof spaced from and directed toward the intake end of said channel, and said steam ducts having the discharge ends thereof opening in said channel inwardly of the intake end thereof, whereby steam is applied to the granules after entry thereof into said channel, said steam ducts being disposed in one row registering approximately with the center of the channel and pass through said casing and into the intake end of said channel, and said ejectors are connected to said casing with the discharge ends thereof positioned to direct granules toward the intake end of the channel from above and below, respectively, said steam ducts.

2. The apparatus as claimed in claim 1, including sealing means adjacent the intake end of said channel interposed between said casing and said endless belts and operative to allow the compressed air from said ejectors to escape from said casing, while directing said granules toward said channel.

3. The apparatus as claimed in claim 1, including pivotal flap means mounted adjacent the discharge end of each of said ejectors for adjustably controlling the flow of granules from the ejectors to the intake end of said channel.

* * * * *